(12) United States Patent
Farmer et al.

(10) Patent No.: US 6,715,093 B1
(45) Date of Patent: Mar. 30, 2004

(54) METHOD FOR TRIGGERING AN ASYNCHRONOUS EVENT BY CREATING A LOWEST COMMON DENOMINATOR CLOCK

(75) Inventors: James C. Farmer, Sunnyvale, CA (US); Kent A. Dickey, Westford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/560,194

(22) Filed: Apr. 28, 2000

(51) Int. Cl.[7] .................................................. G06F 1/12
(52) U.S. Cl. ...................................... 713/400; 713/500
(58) Field of Search ................................ 713/400, 500, 713/501, 502; 716/4

(56) References Cited

U.S. PATENT DOCUMENTS

| | | | | |
|---|---|---|---|---|
| 4,562,402 A | * | 12/1985 | Irvin ........................... | 327/156 |
| 5,867,695 A | * | 2/1999 | Amini et al. ................ | 713/503 |
| 5,886,904 A | * | 3/1999 | Dai et al. ..................... | 703/14 |
| 5,935,257 A | * | 8/1999 | Nishimura .................. | 713/503 |
| 5,952,857 A | * | 9/1999 | Suzuki ........................ | 327/149 |
| 6,396,887 B1 | * | 5/2002 | Ware et al. .................. | 375/354 |

FOREIGN PATENT DOCUMENTS

| | | | | |
|---|---|---|---|---|
| JP | 61140221 A | * | 6/1986 | .......... H03K/21/38 |
| JP | 01085435 A | * | 3/1989 | ............. H04J/3/06 |
| JP | 05054386 A | * | 3/1993 | ............. G11B/7/00 |
| JP | 2001007805 A | * | 1/2001 | ........... H04L/12/02 |

* cited by examiner

Primary Examiner—Thomas Lee
Assistant Examiner—Mark Connolly

(57) ABSTRACT

A method and apparatus are disclosed for allowing a system having multiple clock domains to be put into a known state to ensure repeatability during debugging tests. A global framing clock is created having a frequency equal to the lowest common denominator of all clocks in the system or to some divisor of thereof. At this frequency, the global framing clock ensures that it will have a rising edge at the same time that other clocks in the system have rising edges. The system clock and the global framing clock may be run throughout the system to integrated circuits. The global framing clock is used to control a system function, such as a reset or an interrupt function. When the system receives an asynchronous event, the global framing clock ensures that the event is not distributed to the system until the occurrence of a rising edge of the global framing clock. This ensures that the event will also be seen on a rising edge of every other system clock, which makes the event appear at the same time throughout the system. By ensuring that an asynchronous function, such as a reset function, appears at the same time throughout the system, the system becomes repeatable. That is, the clock states will be the same every time an asynchronous event is released to the system.

1 Claim, 6 Drawing Sheets

METHOD FOR TRIGGERING AN ASYNCHRONOUS EVENT BY CREATING A LOWEST COMMON DENOMINATOR CLOCK

TECHNICAL FIELD

The technical field relates generally to computer architecture and more particularly, but not by way of limitation, to a method and apparatus for allowing repeatable system behavior in an integrated circuit with multiple clock domains by ensuring that a reset takes effect at the same time with respect to each clock.

BACKGROUND

In the field of integrated circuit (IC) chip design, it is necessary to test the chips to identify any bugs that may exist. However, debugging becomes more difficult as the level of system complexity increases. The debugging process is expensive in terms of time spent identifying bugs and the equipment that must be used in this process. In complex systems, it is impractical to monitor every signal from a system under test. Instead, when an error is detected during a test, the test is re-executed on an instrumented prototype to isolate the cause of the failure. To reproduce the test failure on the instrumented prototype, it is essential that the test program execute with the test hardware in exactly the same state that existed when it executed on the original system on which it failed. That is, the system must be repeatable. If the system is not repeatable, then the debugging process takes substantially longer because the same error or bug may not appear in a subsequent test.

One source of non-repeatability has been traced to the relationship between different clocks within the system. A system or an integrated circuit (IC) may use multiple clock domains. In a system with multiple clock domains, a repeatability problem occurs when the system receives an asynchronous event, such as a system reset signal or an interrupt. The problem results because the asynchronous event may take effect at different times for each clock domain. A system may, for example, have a system clock, which is divided into lower frequency clocks, using a clock divider or other means of providing multiple clocks. The system clock and the lower frequency clocks may be distributed to the integrated circuits (IC) in the system. It is impractical due to space constraints to use a single clock divider and to run each clock to every chip in the system. So, existing systems route the system clock throughout the system and then use multiple clock dividers or other means to provide various clocks to chips as needed.

Also throughout existing systems, every IC also has a reset input that triggers when the system must be reset. The reset on each chip actually occurs on the high edge of some clock used by the chip. That is, the reset may be sent to the entire system asynchronously, so in each chip it waits for the next clock cycle to reset. The same situation is true of any asynchronous event that enters the system, such as interrupts and external signals.

Several problems exist due to the use of multiple clock dividers and multiple clock domains. By using multiple clock dividers, each chip's clock may be out of synchronization with other chips' clocks, even those at the same frequency. A system may have a system clock with frequency F. That system clock is then divided into various lower-frequency clocks throughout the system, e.g. F/2, F/4. In existing methods, the system clock is routed throughout the system to each chip. Each chip then divides the system clock to create lower frequency clocks for use in the particular chip. The problem with these systems is that each chip divides the system clock at an arbitrary point in the clock cycle. Each time these systems start, the lower frequency clocks may be in a different state. For example, two chips may divide a the system clock to produce a frequency of F/2, yet even if those F/2 clocks are synchronous, they may still be out of phase with respect to each other. The problem becomes even more pronounced in more complicated systems involving multiple chips, each of which may produce multiple clocks. When the clocks throughout the system are out of phase with respect to each other, it becomes difficult to control the state of the system and to create repeatability.

One problem in particular relates to the handling of asynchronous events, such as a reset function. In a system with multiple clock domains, the asynchronous event may be seen at different times in different domains. Even in a system having a single clock divider and multiple clock domains, a problem still exists with respect to these events. Because the event enters the system asynchronously, different clock domains realize the event at different times. Also, these times may be different every time the system is tested, depending upon the clock states during the test.

FIG. 1 illustrates a problem with controlling the clock state, using a system reset function as an example of an asynchronous event. FIG. 1 shows two separate clock cycles for a fast clock and a slow clock in which the clocks are synchronous and have corresponding rising edges. The fast clock has a frequency equal to twice that of the slow clock. In the example shown in FIG. 1, the reset occurs when the slow clock is high and the fast clock is low. The reset is not sent to the system until the occurrence of a rising clock edge. In the example shown, the reset is realized on part of the chip sooner than it is realized on other parts of the chip. That is, the reset is realized on the rising clock edge of the fast clock first, for those parts of the chip within the fast clock's domain. In the example of FIG. 1, those parts of the chip within the slow clock's domain do not realize the reset until some time later when it has a rising edge. The difference in clock speeds prevents the reset from being seen throughout the entire chip at the same time. FIG. 1 is a simplified version of a system having only two clocks shown. Obviously, the problem becomes substantially more complex in systems that use multiple clock domains.

The problem with the delay between clock domains comes in the area of debugging the system. In order to debug the system, it is desirable to recreate the exact situation that caused the error. To do that, it is necessary to insure that the system is in exactly the same state that it was when the error occurred. To insure that, the asynchronous event must be sent throughout the entire chip at the same time. What is needed is a common reference for all system clocks without the difficulty caused by running every clock throughout the system. In particular, with respect to the handling of asynchronous events, what is needed is a method and an apparatus for allowing the event to take effect at a single instance throughout an IC or a system having multiple clock domains.

SUMMARY OF THE INVENTION

A method and apparatus are disclosed for allowing a system having multiple clock domains to be put into a known state to ensure repeatability during debugging tests. A global framing clock is created having a frequency equal to the lowest common denominator of all clocks in the system or to some divisor thereof. At this frequency, the global framing clock ensures that it will have a rising edge at the same time that other clocks in the system have rising edges. The system clock and the global framing clock are run throughout the system to integrated circuits.

The global framing clock is used to control a system function, such as a reset or an interrupt function. When the system receives an asynchronous event, the global framing clock ensures that the event is not distributed to the system until the occurrence of a rising edge of the global framing clock. This ensures that the event will also be seen on a rising edge of every other system clock, which makes the event appear at the same time throughout the system. By ensuring that an asynchronous function, such as a reset function, appears at the same time throughout the system, the system becomes repeatable. That is, the clock states will be the same every time an asynchronous event is released to the system.

DETAILED DESCRIPTION

The system makes itself repeatable by creating a common timing reference throughout the system. This is done by creating a synchronous global framing clock having an edge that corresponds to and is aligned with an edge of every other clock, such that the state of every clock in the system or subsystem or chip is the same at a known time. For instance the global framing clock may have a rising edge at the same time that every other clock in the system has a rising edge. Alternatively, the aligned edge may be a falling edge.

As used herein, the term global framing clock refers to any clock or data stream that functions similar to a clock. For instance, in one embodiment, a clock may be used as an input to a flip-flop or other such device and the global framing clock may be created from the data stream that is the output of the flip-flop. Also, the global framing clock may be a newly created clock or it may be an existing clock used for various system functions having an edge aligned with other clocks. The global framing clock may be derived from the system clock through a clock splitter or other device, or it may be its own, separate clock.

One way of creating the aligned clock edge is to set the global framing clock at a frequency equal to the lowest common denominator of all system clocks. This would create the fastest possible clock having an edge aligned with all other clocks, although the fastest aligned clock may not be desirable for a particular implementation. The global framing clock could, of course, have a frequency equal to any divisor of the lowest common denominator of all of the system clocks. That is, if the lowest common denominator of all system or subsystem clocks is F/8, then the global framing clock could have a frequency of F/8, F/16, F/24, F/32, etc. The global framing clock may be an existing clock This global framing clock is used as a common reference for timing. It may be used in an isolated IC, or it may be distributed throughout an entire system or subsystem. This global framing clock is used to control asynchronous events by preventing these events from occurring until the global framing clock sends a certain signal, such as one corresponding to a rising edge. When the global framing clock has a rising edge, so does every other clock in the system.

Figure 1:
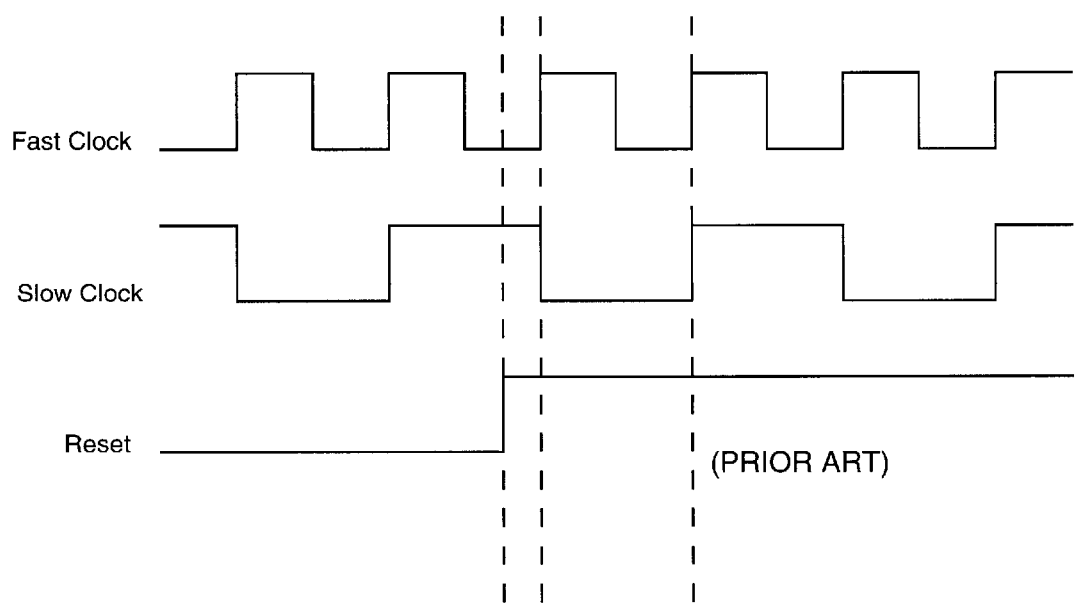
FIG. 1 is a timing diagram illustrating the timing problem of the prior art.
Figure 2:
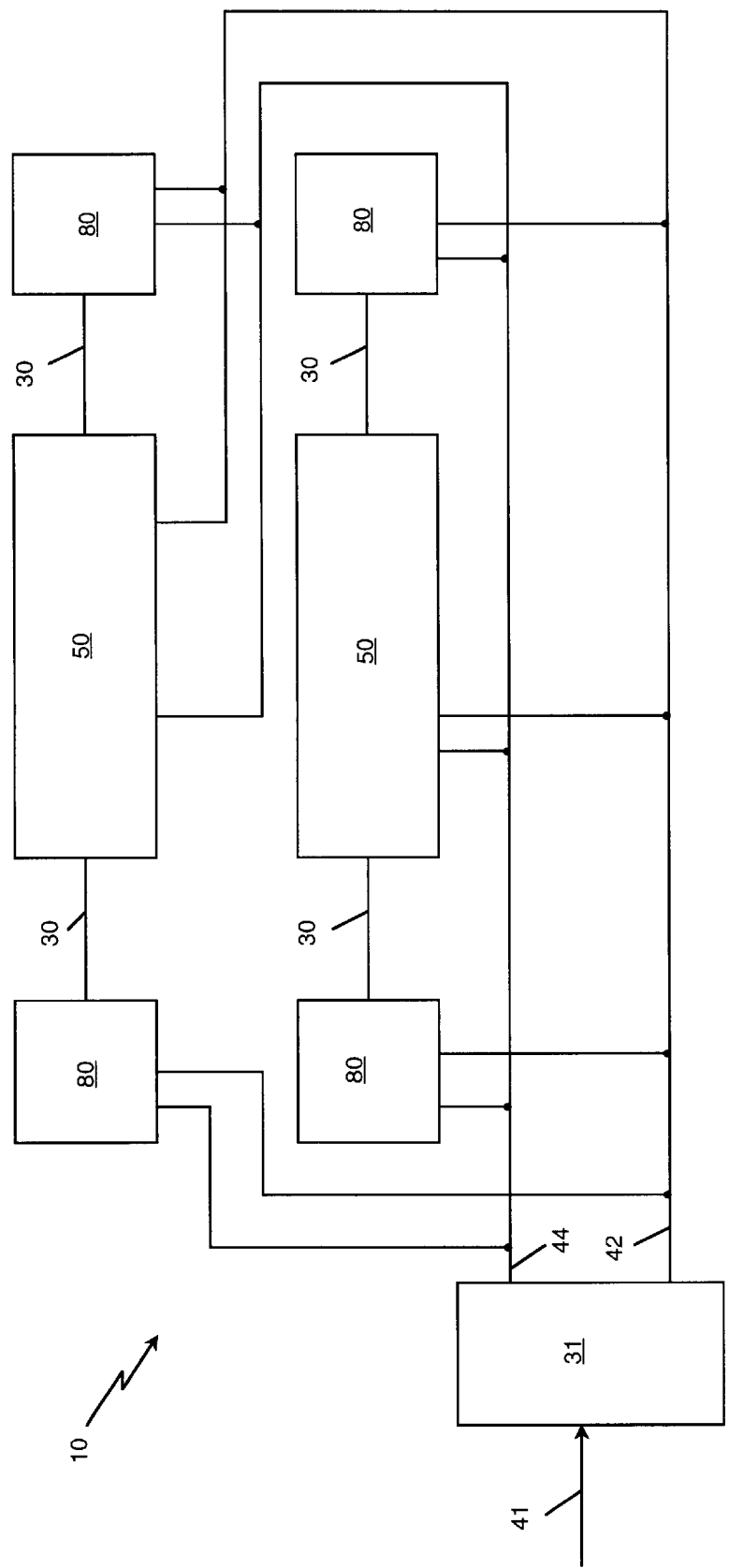
FIG. 2 is block diagram showing the routing of the clocks throughout the system.

FIG. 2 shows a system 10 having multiple processors 80 and cross-bar chips 50 interconnected by links 30. The system 10 has a system clock 41 and a global framing clock 44. The implementation shown creates the global framing clock 44 by sending the system clock to a clock divider 31. The clock divider 31 splits the system clock 41 into lower frequency clocks. Two output clocks are taken from the clock divider 31 and sent throughout the system 10, instead of simply sending the system clock 41. The fast clock 42 has the same frequency of the system clock 41, and the global framing clock 44 has a frequency equal to the lowest common denominator of all clocks in the system 10. These two clocks may be sent throughout the system or subsystem, and specific chips or groups of chips may create additional synchronous clocks with varying frequencies.

Running the global framing clock 44 throughout the system 10 creates a common reference for all other clocks, which aids in timing repeatability. By definition, the global framing clock 44 is set to have a rising edge at the same time every other system clock has a rising edge. Thus, the global framing clock 44 may control all of the chips when a particular function is tied to its state. For instance, a reset function that is tied to the state of the global framing clock 44 will necessarily occur at the same time in every chip, because every chip is tied to the global framing clock 44.

Figure 3:
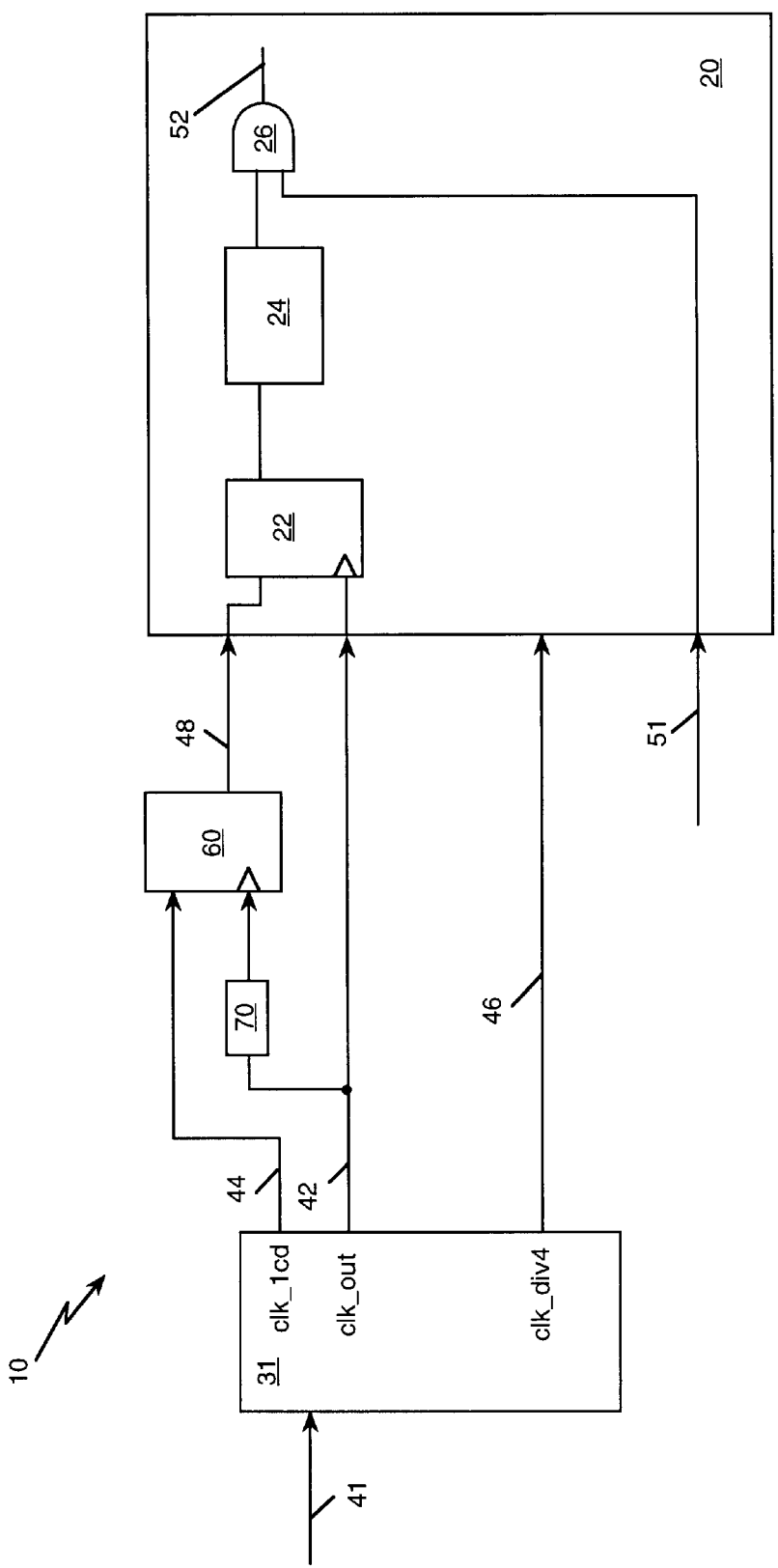
FIG. 3 is a block diagram showing the system.

FIG. 3 shows a more detailed implementation of a system 10 having an IC 20 and a clock divider 31. In the example shown in FIG. 3, the global framing clock is used by a single chip 20, although it could be routed to other chips (not shown). The system clock 41 is input into the clock divider 31, which clock divider 31 divides the system clock 41 into multiple clocks with varying frequencies. In the example shown in FIG. 3, the clock divider 31 has a fast clock 42 that is output out the clk_out port and a slow clock 46 which is output the clk_div 4 port. The output clocks 42, 46 are input into the IC 20. The IC 20 also has a system reset input 51 for receiving an asynchronous system reset signal. Unlike the prior art, the system 10 also includes the global framing clock 44 which is output the clock divider 31 through the output port clk_div 32 in FIG. 3.

The frequency of this global framing clock 44 is set at the lowest common denominator of all of the clocks used the throughout the system 10. By setting the frequency at the lowest common denominator, the system 10 ensures that every clock in the synchronous system 10 will have a rising edge on each rising edge of the global framing clock 44. The global framing clock 44 is input into a flip-flop 60. The fast clock 42 is delayed through a delay 70 and is used as the clock for the flip-flop 60. The delay 70 is used to create sufficient set up time for the flip-flop 60. The output data stream is referred to as the framing clock 48 and is input into the IC 20. In the IC 20, the framing clock 48 is input into another flip-flop 22 which is also clocked by the fast clock 42. The output of the IC flip-flop 22 is input into edge detect logic 24, and the output of the edge detect logic 24 is input into an AND gate 26. The other input into the AND gate 26 is the system reset input 51. The output 52 of the AND gate 26 is then used as the chip reset for the entire IC 20.

Figure 4:
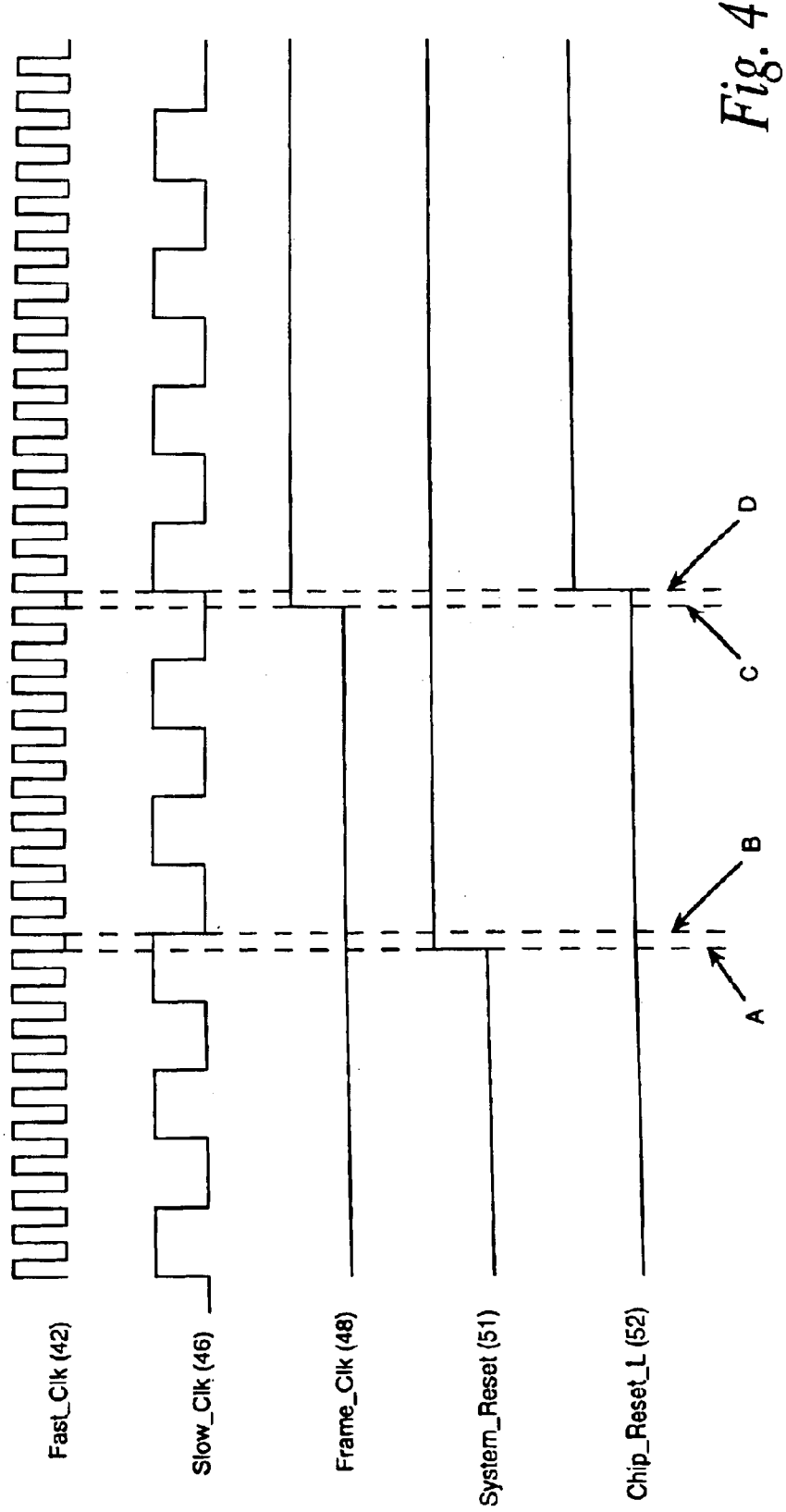
FIG. 4 is a timing diagram of the present invention.

FIG. 4 shows a timing diagram of the system 10. The fast clock 42 operates at a frequency three times faster than the slow clock 46 in FIG. 4. In the example shown by FIG. 4, the system reset 51 is triggered without triggering the chip reset 52, because the framing clock 48 is used to control the chip reset 52. Without the framing clock 48, the reset would occur at different times in different clock domains, because, as illustrated in FIG. 4, the system reset 51 might be released on a falling edge of the fast clock 42 and would take effect in the fast clock domain on the next rising edge of the fast clock 42. However, as shown in FIG. 4, that next rising edge of the fast clock is a falling edge of the slow clock 46. Therefore, without the framing clock 48, the reset would not be seen in the slow clock domain until the next rising edge of the slow clock 46, even though the fast clock domain has already seen the system reset 51.

The system 10 uses the framing clock 48 to ensure that the reset takes effect in all clock domains at the same time. A rising edge of the framing clock 48 is required for the system 10 to apply a reset. Because the rising edge of the framing clock 48 is designed to correspond to every clock in the system 10, the reset will be released to every clock domain at the same time. By releasing the reset to every clock domain at the same time, the system ensures that the timing will be repeatable. That is, every time that the system reset signal 51 is issued, the reset will actually be issued at the same time, on a rising edge of every clock. This illustration applies to a reset function, but the same global framing clock 44 can be used to ensure the repeatability of any signal that must be distributed throughout the system, by coordinating the timing of that signal with the global framing clock 44.

Figure 5:
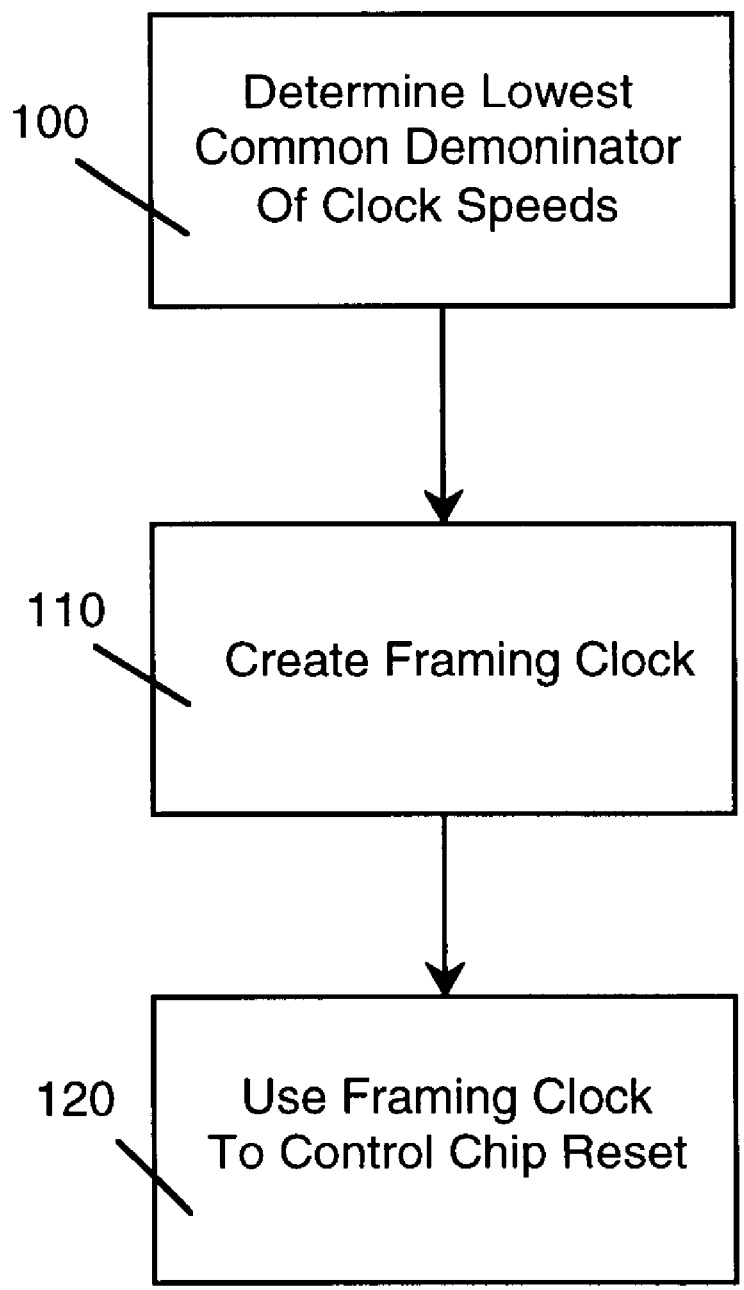
FIG. 5 is a flow chart showing the method of the present invention.
Figure 6:
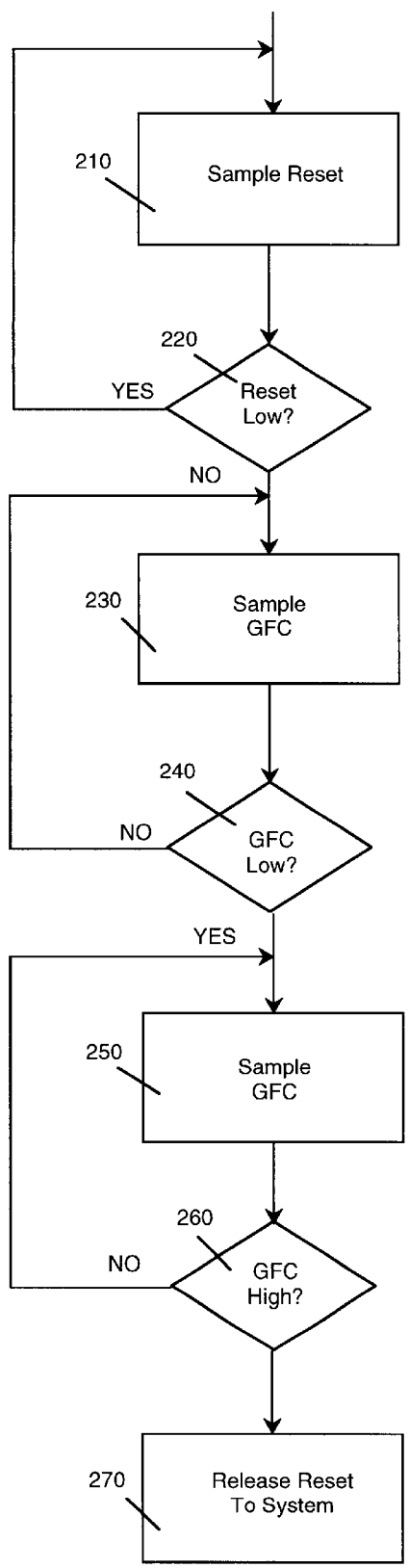
FIG. 6 is a more detailed flow chart of the method of FIG. 5.

FIG. 5 shows a flow chart of a method for allowing repeatable system behavior in an IC having multiple clock domains. FIG. 5 uses the system reset as an example of an asynchronous event. The system reset 51 is sampled 210. If the system reset 51 is low, then the method loops 220 back around to sample 210 the system reset 51 again. If the system reset 51 is high, then the method continues 230 and samples 240 the global frame clock 44. The system continues to sample the global frame clock if it is high 240. When the global frame clock 44 turns low, then the method proceeds and again samples 250 the global frame clock 44 until it is high, on the occurrence of a rising edge 260. When the global frame clock 44 transitions to a high state, then the system releases, or de-asserts, the reset so that the entire system realizes the reset at the same time.

Although the present invention has been described in detail with reference to certain embodiments thereof, variations are possible. The present invention may be embodied in other specific forms without departing from the essential spirit or attributes thereof. Although illustrations of the method and system have been given showing an implementation involving a system reset function, these references are intended to be illustrative and not restrictive. One skilled in the art will recognize the invention's application to any sort of asynchronous event, such as a reset, an interrupt, and any other internal or external signal. Also, the system illustrated herein may use a clock divider to create multiple clock domains. Again, one skilled in the art will recognize that these multiple clock domains may be created any number of ways, including through the use of a clock divider, a PLL, or multiple free-standing clocks. It is desired that the embodiments described herein be considered in all respects as illustrative, not restrictive, and that reference be made to the appended claims for determining the scope of the invention.

What is claimed is:

1. A method of creating repeatability of a system having multiple clock domains created by a plurality of intermediate clocks by causing a system reset function to take effect in all clock domains at the same time comprising:

creating a global framing clock signal having a rising edge that corresponds to the rising edges of the plurality of clocks, wherein the global framing clock has a frequency equal to the lowest common denominator of the plurality of intermediate clocks or to some divisor thereof, wherein creating a global framing clock signal comprises:
receiving an input of a system clock into a clock divider;
dividing the system clock into the global framing clock signal using the clock divider;
receiving the global framing clock signal as an input into a flip-flop timed by the system clock; and
using an output data stream from the flip-flop as a framing clock to control the release of the system reset signal to the system, wherein the flip-flop is clocked by a delayed version of the system clock;

receiving an asynchronous event;

waiting for a rising edge of the global framing clock signal; and releasing the asynchronous event to the system when the rising edge of the global framing clock signal occurs.

* * * * *